Figure 1:
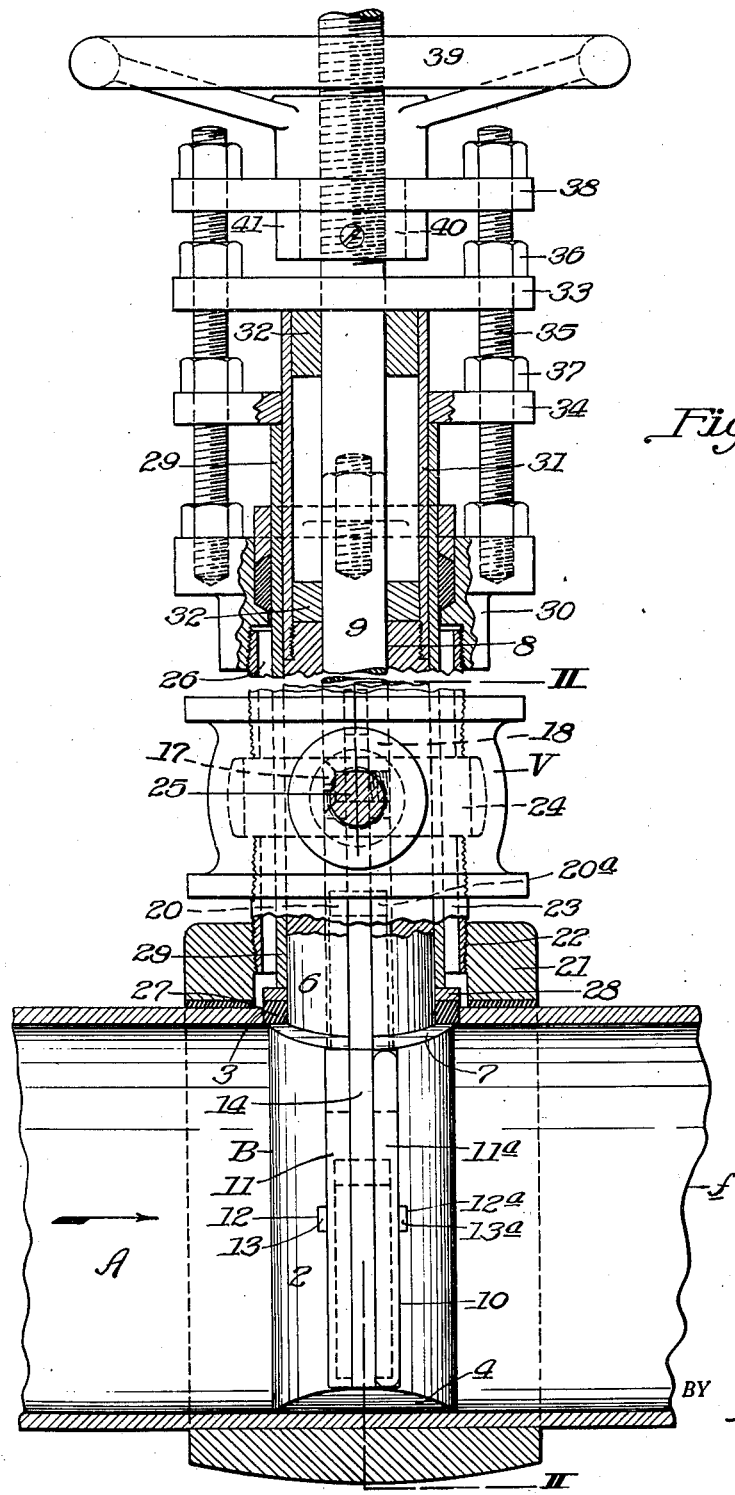

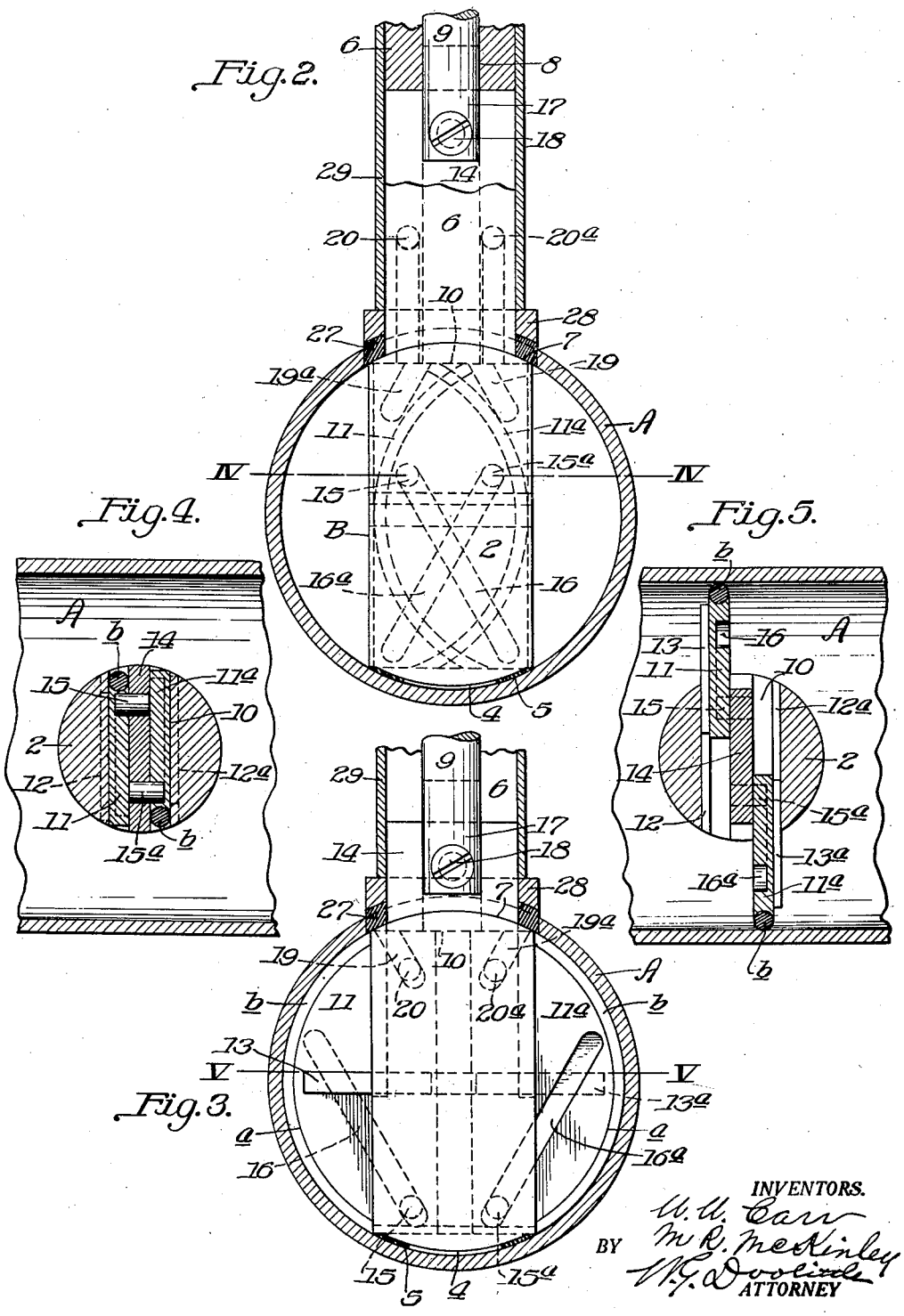

Patented Nov. 1, 1932

1,885,896

UNITED STATES PATENT OFFICE

UHEL U. CARR AND MAJOR R. McKINLEY, OF MONONGAHELA, PENNSYLVANIA

PIPE LINE STOPPER

Application filed February 3, 1931. Serial No. 513,140.

This invention relates to improvements in closure devices or stoppers of the character particularly adapted for use in closing off or stopping the flow of fluid, as gas and/or oil, through a pipe line or main. It is especially adapted for use when a break occurs in a gas main containing gas at a considerable pressure, and is designed to be employed in connection with the usual and well known forms of saddle and yoke constructions for securing branch pipe lines to the main.

It is a prime object of our invention to provide a simple and efficient closure device or stopper of the character designated, which may be readily applied and manipulated to efficiently shut off the flow through the main without subjecting the operator to escaping gas.

Further objects are, to provide a self-contained construction readily inserted through a relatively small opening cut in the wall of the main, and including movable diaphragm members for sealing the main; positive means operable from outside the main for expanding the diaphragm members into sealing engagement with the walls of the main; and having means associated therewith for preventing the escape of gas or other fluid while positioning the closure device in or removing the same from the main.

Our invention may be more readily understood from the following description taken in connection with the accompanying drawings, wherein:

Fig. 1 is a view partly in elevation and partly in vertical section, illustrating a closure device embodying our invention applied to a gas main, with the closure means thereof in retracted position;

Fig. 2, a vertical sectional view partly in elevation, omitting the saddle structure, taken on the line II—II of Fig. 1;

Fig. 3, a view similar to Fig. 2, but with the closure means in expanded or open position;

Fig. 4, a cross section taken on the line IV—IV of Fig. 2; and

Fig. 5, a cross section taken on the line V—V of Fig. 3.

Referring to the drawings, A designates a portion of a main or conduit for conveying fluids, as for example, a pipe line for gases, which has become fractured at $f$. To enable repair thereof and/or maintain an uninterrupted supply of gas through the main, it is necessary to shut off the broken end $f$ in some manner, and it is to this object that our invention is particularly directed.

Accordingly, we have provided a closure device or stopper generally designated B and including a cylindrical body 2 adapted to be inserted into the main A through an opening 3 in the wall thereof. The lower end 4 of said body is rounded to fit the curvature of the pipe wall, and may be provided with a circular packing element 5 of rubber or other resilient material to prevent the escape of gas or fluid between the end 4 and the pipe wall.

Extending upwardly from the body 2 and preferably integral therewith, we provide a hollow body portion 6 of smaller external diameter than the said body, thus forming a shoulder or abutment 7. Said shoulder 7 is also curved to fit the curvature of the pipe wall. The body portion 6 is formed with a central longitudinally extending opening 8 adapted to receive an operating stem 9 operable in a manner hereinafter described.

The body 2 is provided with a transverse slot 10 therethrough for receiving a pair of segmentary diaphragm members 11 and 11a, adapted to be expanded and retracted in spaced-apart parallel planes, and having outer arcuate edges $a$, said slot and members extending longitudinally of the body. The walls of the slot 10 are formed with opposed transversely extending guide grooves 12 and 12a for receiving and containing tongues or projecting ribs 13 and 13a on the diaphragm members 11 and 11a respectively. The width of the members 11 and 11a is such that they may be entirely contained within the slot 10 when in retracted position.

Positioned between the diaphragm members and designed for cooperation therewith, we provide a plate member 14 having means thereon for expanding and retracting the said diaphragm members, said means including spaced-apart pins 15 and 15a extending outwardly from the plate member and at opposite sides thereof. The pins 15 and 15a are received in and cooperate with oppositely inclined slots or grooves 16 and 16a in opposite faces of the diaphragm members 11 and 11a respectively.

The inclined grooves 16 and 16a are constructed in such a manner that when the diaphragm members 11 and 11a are in the retracted position of Fig. 2, said grooves are symmetrically disposed with respect to the longitudinal axis of the body 2, and the said pins 15 and 15a are positioned in the uppermost extremities of the grooves.

The expanding plate member 14 extends outwardly beyond the main A and is secured to the bifurcated end 17 of the operating stem 9, as by means of a screw or bolt 18. Hence, downward movement of the stem 9 will cause the diaphragm members 11 and 11a to move outwardly in spaced-apart parallel planes but in opposite directions, due to the action of the pins 15 and 15a in their respective grooves, until the arcuate edges a of the said members engage the walls of the main A to effect a seal. The edges a are preferably provided with yieldable gasket or packing elements b of rubber or other suitable material, for providing a perfect seal with the walls of the main.

In addition, the diaphragm members 11 and 11a may be provided with open-ended grooves 19 and 19a respectively, for cooperation with a second pair of pins 20 and 20a on the plate member 14, to assist the expansion of said members. The said pins are spaced-apart and project from opposite sides of the plate member, and the slots or grooves 19 and 19a are respectively inclined in parallelism with the grooves 16 and 16a.

The pins 20 and 20a are spaced above their respective slots when the members 11 and 11a are in the retracted position of Fig. 2, and are lowered with the plate member 14 to enter the open ends of said slots during the expansion of the diaphragm members. The additional coaction of these pins and grooves effects and assists the final sealing action of the diaphragm members, and also serves to maintain said members in expanded relation.

Thus, it will be seen that the closure device or stopper B is of self-contained construction, readily operable to effect a perfect seal with the walls of the gas main A, and is capable of the application of considerable pressure uniformly throughout the seal. The manner of applying such pressure from outside the main, and without endangering the operator to escaping gas, constitutes another important feature of our invention.

In practicing our invention, a pipe saddle 21 is first secured to the main A in the usual manner, adjacent to and on the pressure side of the break f, said saddle having a threaded opening 22 therein for receiving the threaded end of a tubing section 23 extending at right angles to the main A. The remaining end of the tubing 23 is screw-threaded into one side of a horizontally disposed gate valve V, having a gate 24 therein adapted to be translated by means of an operating stem 25.

A second tubing section 26 is screw-threaded into the other side of the gate valve V. A drill, not shown, is lowered through the tubing 26, valve V, and tubing 23, onto the main A. A suitable stuffing-box is affixed to the outer end of the tubing 26 and around the drill shank to protect the operator from escaping gas. The drill is rotated by external means and the circular opening 3 is cut through the wall of the main A, whereupon the drill is retracted and the gate 24 of the valve closed to prevent the escape of gas. The drilling stuffing-box is then removed from the tubing 26, together with the drill.

The closure device or stopper B is placed on the gate 24 of the valve V, together with a resilient packing ring 27, a metallic washer or ring 28, and a surrounding hollow sleeve 29, the packing ring contacting with the shoulder 7, and the lower end of the sleeve 29 engaging the washer.

The said sleeve 29 extends outwardly beyond the end of the tubing 26, and a packing gland or stuffing-box 30 is screw-threaded onto the tubing 26 around the sleeve 29, as shown.

A second sleeve 31 is placed within the sleeve 29 and is provided with a pair of frictionally held bushings or bearing rings 32 having central openings therethrough for receiving and guiding the operating stem 9. The lower end of the sleeve 31 is screw-threaded onto the upper end of the body portion 6. Suitable clamping members 33 and 34 are loosely placed upon threaded studs 35 secured in a flange of the stuffing-box 30.

Upon opening the gate 24 of the valve V, the device is lowered into position. Tightening of the nuts 36 will force the body 2 into place by means of the clamping member 33 and the sleeve 31. Tightening of the nuts 37 to urge the downward movement of the clamping member 34 will cause the sleeve 29 to further seat the body 2 on the walls of the main A, and prevent movement thereof. At the same time, the pressure exerted thereby will cause the packing ring 27 to pack off the opening 3, and the packing element 5 to seal the lower end of the body, to prevent the escape of gas.

A cross piece 38 may then be secured to the studs 35 in the manner shown, said piece 38 carrying a hand wheel 39 having a hub 40 extending therethrough and rotatably secured by means of a retaining collar 41 fixed to said hub. The hub 40 is screw-threaded onto the operating stem 9, whereby rotation of the hand wheel will translate the stem therethrough to operate the plate 14 of the closure device, as hereinbefore described.

It will be seen that the diaphragm members 11 and 11a are, therefore, expanded by a positive mechanism, and one capable of exerting considerable pressure to provide a perfect seal with the walls of the main A; and also, that the entire application and operation of the device eliminates the dangers to the operator of escaping gas.

We claim:

1. A device of the character described including a slotted body adapted for insertion through an opening in a pipe, a pair of diaphragm members carried by said body and operable in a slot thereof, and means for expanding and retracting said members in spaced-apart parallel planes at right-angles to the longitudinal axis of the pipe.

2. A device of the character described, including a slotted body adapted for insertion through an opening in a pipe, a pair of diaphragm members having inclined grooves therein carried by said body and operable in a slot thereof, and means for expanding and retracting said members in spaced-apart parallel planes, said means including a movable member operable in a slot and having projecting means entered in the grooves.

3. A device of the character described including a slotted body adapted for insertion through an opening in a pipe, a pair of diaphragm members having oppositely inclined grooves therein carried by said body and operable in a slot thereof, and means for expanding and retracting said members in spaced apart parallel planes at right-angles to the longitudinal axis of the pipe, said means including a movable member operable in the slot and having projecting means entered in the grooves and an operating stem attached to the movable member.

4. A device of the character described including a body member having a slot therein for insertion through an opening in a pipe, a pair of segmental diaphragm members in the slot, and movable means for expanding said members in spaced-apart parallel planes at right angles to the longitudinal axis of the pipe to effect a seal between the diaphragm members and the interior surface of the pipe.

5. A device of the character described including a cylindrical body member having a slot therein for insertion through an opening in a pipe, a pair of segmental diaphragm members in the slot, movable means disposed between the diaphragm members for expanding and retracting said members in spaced-apart parallel planes at right angles to the longitudinal axis of the pipe, said diaphragm members in expanded position effecting a seal between the interior surface of the pipe and the periphery of each segment.

6. A device of the character described including a body member having a slot therein adapted for insertion through an opening in a pipe, a pair of diaphragm segments carried by the body and operable in the slot thereof having inclined grooves therein, a plate member between the segments, projecting pins on the plate member entered in the grooves, guiding means for the segments, and means for moving the plate member to expand and retract the segments in planes at right-angles to the longitudinal axis of the pipe.

7. A device of the character described including a body for insertion in the pipe, means for fixedly positioning the body in a pipe, a pair of diaphragm segments adjustably mounted on the body, a plate member interposed between the diaphragms, coacting means on said plate and diaphragms for contracting and expanding the diaphragms, and means for moving said plate member.

8. A device of the character described including a cylindrical body for insertion in a pipe, said body having curved top and bottom ends and a projecting cylindrical member, means for fixedly positioning the body in a pipe, a pair of diaphragm segments adjustably mounted on the body, a plate member interposed between the diaphragms, coacting means on said plate and diaphragms for contracting and expanding the diaphragms, and means operable in the projecting cylindrical member for moving said plate member.

In testimony whereof we affix our signatures.

UHEL U. CARR.
MAJOR R. McKINLEY.